April 24, 1928.
J. B. HILL
1,667,550
CONVERSION OF LEAD SLUDGE
Filed July 16, 1927
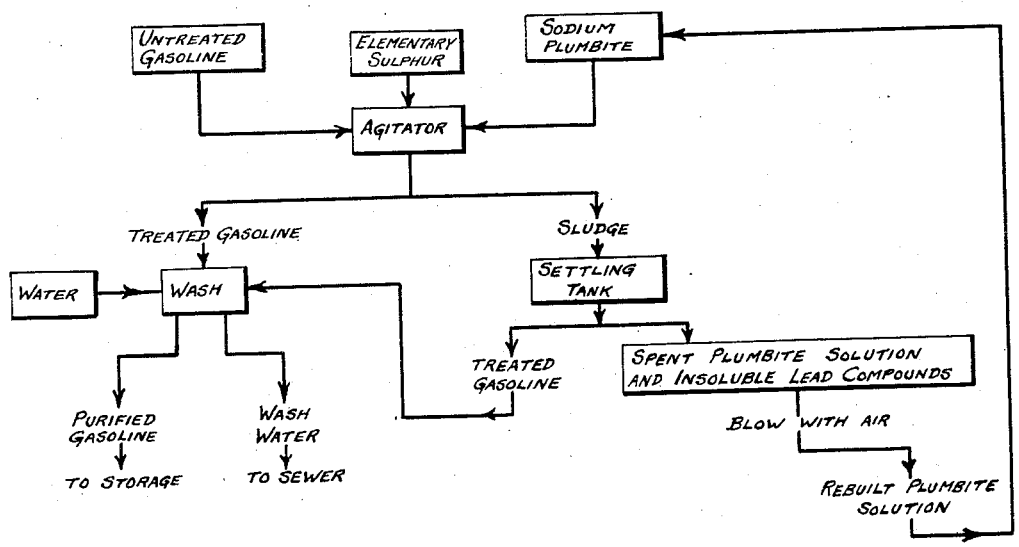
INVENTOR
Joseph B. Hill
BY Cornelius L. Ehret
his ATTORNEY Patented Apr. 24, 1928.

1,667,550

UNITED STATES PATENT OFFICE.

JOSEPH BENNETT HILL, OF PHILADELPHIA, PENNSYLVANIA, ASSIGNOR TO THE ATLANTIC REFINING COMPANY, OF PHILADELPHIA, PENNSYLVANIA, A CORPORATION OF PENNSYLVANIA.

CONVERSION OF LEAD SLUDGE.

Application filed July 16, 1927. Serial No. 206,253.

My invention relates to the treatment of lead sludge formed in the refining of hydrocarbon oil distillates by the action of an alkali metal plumbite solution upon them. The object of my invention is to reconvert this sludge into alkali metal plumbite solution in form suitable for reuse.

In accordance with my invention, the lead sludge is agitated with an aqueous alkaline solution and an oxygen-containing gas, more particularly air, whereby the insoluble lead compounds in the sludge are oxidized to a form in which they dissolve in the alkaline solution with the formation of alkali metal plumbite.

In the treatment of light hydrocarbon oil distillates, such as the naphtha fraction from the distillation of petroleum, it is customary to sweeten such distillates for the removal of malodorous organic sulphur compounds by agitation with an alkali metal plumbite solution, such as sodium plumbite, prepared by dissolving lead oxide, or litharge, in a solution of sodium hydroxide. Such treatment causes a reaction between the sulphur compounds, such as mercaptans, and the plumbite solution with the formation of the lead derivatives of the sulphur compounds such as lead mercaptides. At least a portion of these compounds dissolves in the oil and it is customary to add elementary sulphur in order to precipitate the lead. The lead is precipitated largely in the form of lead sulphide but containing other insoluble lead derivatives of organic sulphur compounds. The process may be typified by the following reactions:

$$2RSH + Na_2PbO_2 = Pb(RS)_2 + 2NaOH$$
$$Pb(RS)_2 + S = PbS + R_2S_2$$

The spent plumbite solution contains sodium hydroxide, or other alkali metal hydroxide, and is separated from the naphtha with the precipitated lead sludge from which it is subsequently separated by decantation.

It has been common practice to discard the lead sludge so produced. Such a practice is, however, economically undesirable on account of the value of the contained lead. Efforts to recover the lead have resulted in complicated processes such as that of Kinsel, U. S. Patent #1,525,301, who treats the lead sludge with sulphuric acid to produce lead sulphate and subsequently filters this out and dissolves it in sodium hydroxide solution.

By means of my invention it is possible substantially completely to recover the lead in the sludge, in a form suitable for reuse for sweetening, by a method requiring only very simple and inexpensive equipment and involving practically no chemical costs. By my process, the lead sludge, after first breaking any emulsion (of the sludge with oil) which may be present by any suitable method, as by application of steam, is treated with the spent plumbite solution from the sweetening operation which, as stated above, contains caustic soda. These two materials are agitated together, preferably at elevated temperature, and simultaneously air or other oxygen-containing gas is blown through the mixture, whereby there is effected an oxidation of the lead sulphide and other insoluble compounds to a form in which they dissolve in the sodium hydroxide with the formation of sodium plumbite. The sulphur is oxidized in the reaction to sodium thiosulphate which remains in solution. The reaction, as applied to lead sulphide, may be written as follows:

$$2PbS + 6NaOH + 2O_2 = 2Na_2PbO_2 + Na_2S_2O_3 + 3H_2O$$

The solution so obtained is in every way satisfactory for reuse in carrying out the sweetening operation.

The drawing is a flow chart showing the application of the process to lead sludge formed in the treatment of gasoline with sodium plumbite.

As an example of my process there may be agitated 100 barrels of lead sludge with 350 barrels of spent caustic solution, the mixture containing about 28,600 pounds of sodium hydroxide and 8,500 pounds of insoluble solids, about 6,800 pounds of which is lead. The mixture is kept at 160° F. for 14 hours while passing therethrough about 700,000 cubic feet of air, causing the conversion of substantially all the lead to a soluble form, yielding about 425 barrels of revivified plumbite solution containing 3.3% soluble lead.

In carrying out my process, the blowing with air may be continued until substantially all of the lead is converted, or from time to time or continuously there may be fed in spent plumbite solution and lead sludge and from time to time or continuously there may be drawn off the regenerated plumbite solution.

To increase the speed of the reaction there may be present during the air blowing oxygen carriers, such as copper sulphate or hydroquinone, which may act catalytically or otherwise.

While I have described my invention with relation to certain theoretical reactions, it shall be understood that I do not intend to limit myself to the correctness of this theory.

By my process it is possible to accomplish a substantially complete recovery of the lead from the lead sludge and, moreover, the process is distinguished in its simplicity from other processes heretofore proposed.

The term "lead sludge" in the appended claims is defined as the sludge resulting in the treatment of hydrocarbon oils by alkali metal plumbite.

I claim:

1. A method of recovering lead compounds from lead sludge, which comprises treating the lead sludge with a solution of an alkali metal hydroxide in the presence of an oxygen-containing gas.

2. A method of recovering lead compounds from lead sludge, which comprises treating the lead sludge with a solution of an alkali metal hydroxide while blowing air therethrough.

3. A method of recovering lead compounds from lead sludge, which comprises treating the lead sludge with a solution of sodium hydroxide while blowing air therethrough.

4. A method of recovering lead compounds from lead sludge, which comprises treating the lead sludge with a solution of sodium hydroxide while in hot condition and while blowing air therethrough.

JOSEPH BENNETT HILL.